US012461685B2

(12) United States Patent
Basu et al.

(10) Patent No.: US 12,461,685 B2
(45) Date of Patent: Nov. 4, 2025

(54) STORAGE SYSTEM WITH MULTIPLE DATA PATHS DEPENDING ON DATA CLASSIFICATIONS

(71) Applicant: Micron Technology, Inc., Boise, ID (US)

(72) Inventors: Reshmi Basu, Boise, ID (US); Aditi P. Kulkarni, Broomfield, CO (US); Kari Crane, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 98 days.

(21) Appl. No.: 18/295,482

(22) Filed: Apr. 4, 2023

(65) Prior Publication Data

US 2023/0325122 A1   Oct. 12, 2023

Related U.S. Application Data

(60) Provisional application No. 63/386,596, filed on Dec. 8, 2022, provisional application No. 63/362,648, filed on Apr. 7, 2022.

(51) Int. Cl.
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0688* (2013.01)

(58) Field of Classification Search
CPC .... G06F 3/0604; G06F 3/0608; G06F 3/0631; G06F 3/0658; G06F 3/0659; G06F 3/0673; G06F 3/0688
See application file for complete search history.

(56) References Cited

U.S. PATENT DOCUMENTS

| | | | | |
|---|---|---|---|---|
| 5,666,114 A | * | 9/1997 | Brodie | G06F 3/0601 711/100 |
| 9,485,687 B2 | * | 11/2016 | Yu | H04W 28/06 |
| 2003/0012209 A1 | * | 1/2003 | Abdelilah | H04L 65/765 370/429 |
| 2003/0065873 A1 | * | 4/2003 | Collins | G06F 3/0643 711/100 |
| 2015/0134857 A1 | * | 5/2015 | Hahn | G06F 3/061 710/5 |
| 2018/0329631 A1 | * | 11/2018 | Swift | G06F 3/0608 |
| 2022/0179701 A1 | * | 6/2022 | Saad | G06F 11/1464 |
| 2023/0221889 A1 | * | 7/2023 | Benisty | G06F 3/0604 711/154 |
| 2023/0393877 A1 | * | 12/2023 | Maroney | G06F 3/0664 |

* cited by examiner

*Primary Examiner* — Aracelis Ruiz
(74) *Attorney, Agent, or Firm* — Harrity & Harrity, LLP

(57) ABSTRACT

In some implementations, a storage system may receive, via a system controller of the storage system, a write command and data associated with the write command. The storage system may classify, via the system controller, the data. The storage system may associate, via the system controller, the data with a queue based on classifying the data. The storage system may retrieve, via a processor of the storage system, the data associated with the queue. The storage system may compress, via the processor, the data to form compressed data for storage in a memory device of the storage system based on the write command.

20 Claims, 9 Drawing Sheets

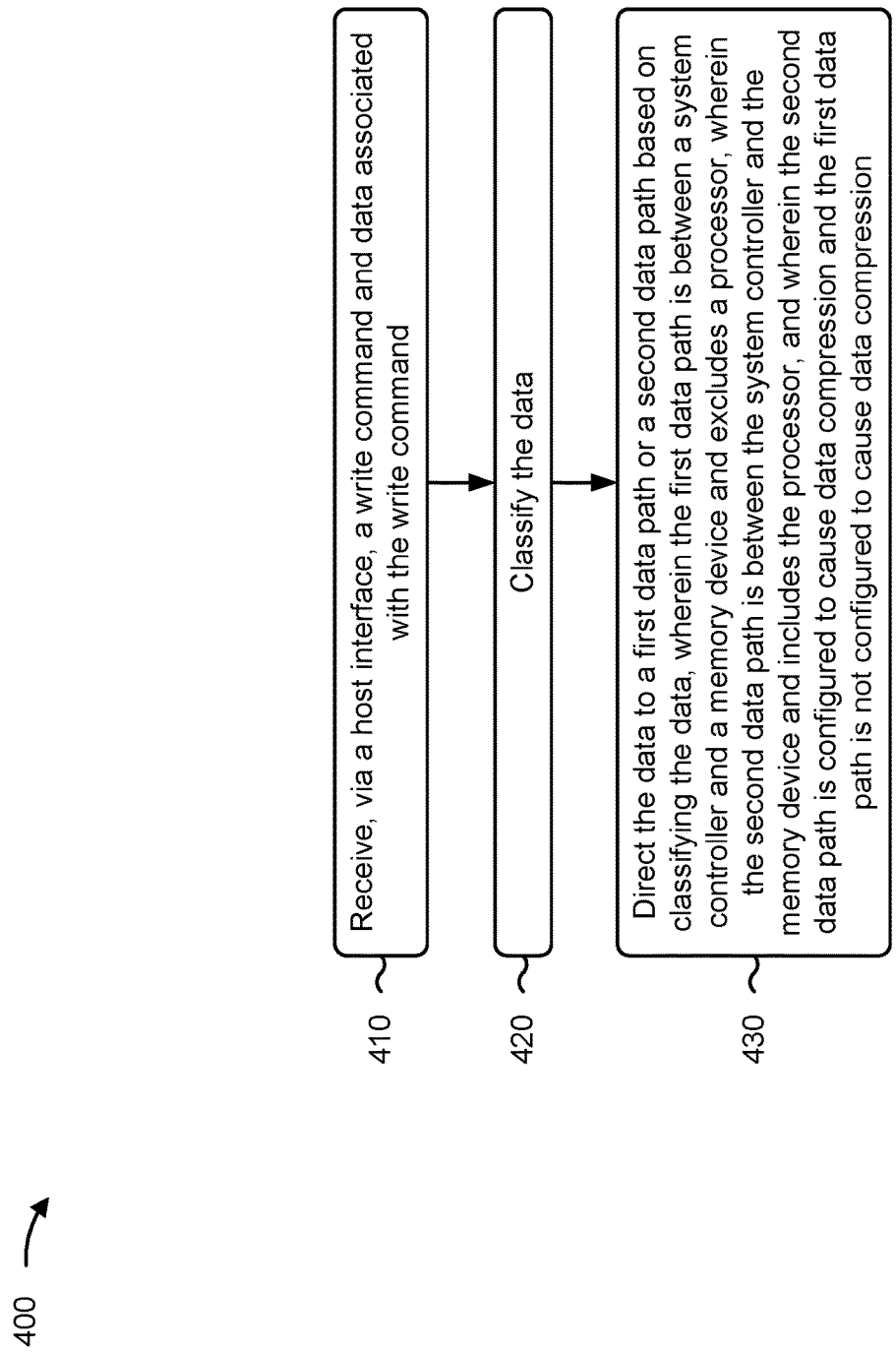

STORAGE SYSTEM WITH MULTIPLE DATA PATHS DEPENDING ON DATA CLASSIFICATIONS

CROSS-REFERENCE TO RELATED APPLICATION

This patent application claims priority to U.S. Provisional Patent Application No. 63/362,648, filed on Apr. 7, 2022, and entitled "STORAGE SYSTEM WITH MULTIPLE DATA PATHS DEPENDING ON DATA CLASSIFICATIONS" and to U.S. Provisional Patent Application No. 63/386,596, filed on Dec. 8, 2022, and entitled "STORAGE SYSTEM WITH MULTIPLE DATA PATHS DEPENDING ON DATA CLASSIFICATIONS". The disclosures of the prior applications are considered part of and are incorporated by reference into this patent application.

TECHNICAL FIELD

The present disclosure generally relates to storage systems and, for example, storage systems with multiple data paths depending on data classifications.

BACKGROUND

NAND flash memory, which may also be referred to as a "NAND" or a "NAND memory device," is a non-volatile type of memory device that uses circuitry similar to or resembling NAND logic gates to enable electrically programming, erasing, and storing of data even when a power source is not supplied. NANDs may be used in various types of electronic devices, such as computers, mobile phones, or automobile computing systems, among other examples.

A NAND memory device may include an array of flash memory cells, a page buffer, and a column decoder. In addition, the NAND memory device may include a control logic unit (e.g., a controller), a row decoder, or an address buffer, among other examples. The memory cell array may include memory cell strings connected to bit lines, which are extended in a column direction.

A flash memory cell, which may be referred to as a "cell" or a "data cell," of a NAND memory device may include a current path formed between a source and a drain on a semiconductor substrate. The flash memory cell may further include a floating gate and a control gate formed between insulating layers on the semiconductor substrate. A programming operation (sometimes called a write operation) of the flash memory cell is generally accomplished by grounding the source and the drain areas of the memory cell and the semiconductor substrate of a bulk area, and applying a high positive voltage, which may be referred to as a "program voltage," a "programming power voltage," or "PPV," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the flash memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the flash memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A memory device may include a plurality of page buffers connected between the bit lines and the column decoder. The column decoder is connected between the page buffer and data lines.

BRIEF DESCRIPTION OF THE DRAWINGS

FIGS. 4-5 are flowcharts of example methods associated with storing data using multiple storage paths depending on data classifications.

DETAILED DESCRIPTION

Figure 1:
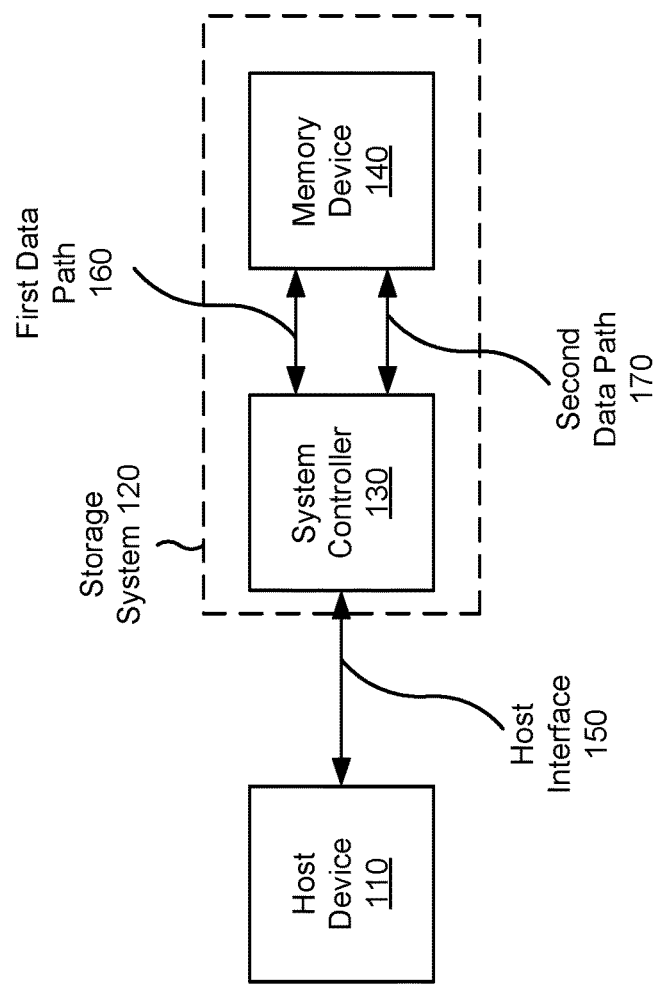
FIG. 1 is a diagram illustrating an example of a system capable of storing data using multiple storage paths depending on data classifications.

A storage system may include a system controller and a memory device. The system controller may receive a write command, from a host device external to the storage system, to store data in the memory device. The system controller may receive a read command, from the host device, to read data from the memory device. The system controller may have access to a system memory of the storage system. For the write command, the data may be stored in the system memory, and then translated for storage in the memory device. The system memory may store a logical-to-physical address translation table, which may be used to determine an appropriate location in the memory device for storage of the data. For the read command, the logical-to-physical address translation table may be used to retrieve the data from the memory device.

The data stored in the memory device may be used for various purposes, such as machine learning or artificial intelligence. For example, the data stored in the memory device may be training data for a machine learning model. However, certain types of data (e.g., biological experiment data) may suffer from noise and/or data redundancy. The noise may result from errors that occurred during data collection, such as contaminations of data samples. The data redundancy may result from repetitive data, which may increase an overall size of the data. Typically, the data stored in the memory device, which may suffer from the noise and/or data redundancy, may be read by the system controller and be provided to the host device, which may perform some data processing using the data retrieved from the memory device. Due to the noise and/or data redundancy in the data, the data processing may be associated with a higher processing time and/or a lower processing efficiency.

In some implementations, to improve data processing of data subjected to noise and/or data redundancy, such data may first be processed (e.g., pre-processed) by a processor of the storage system before storage of the data in the memory device. The data may be initially processed to remove noise and/or data redundancy, to form compressed data, and then the compressed data may be stored in the memory device. Depending on the type of data (e.g., non-image data versus image data), the data may be processed by the processor to form the compressed data prior to the storage of the data in the memory device, or alternatively, the data may not be processed by the processor and instead may be directly stored in the memory device. When the data is not processed by the processor, the data may bypass the processor and be stored in the memory device. When the compressed data is later retrieved from the memory device, the data processing of the compressed data may not be less impacted by the noise and/or data redundancy that was initially associated with the data (e.g., unprocessed data or uncompressed data), thereby improving a performance of the data processing.

In some implementations, the processor may provide a hardware acceleration, which may involve removing the noise and/or the data redundancy from the data prior to storage of the compressed data in the memory device and prior to further data processing (e.g., for machine learning or artificial intelligence purposes). By processing the data prior to the storage, an overall performance of processes (e.g., machine learning processes) that consume the data may be improved. In contrast, past hardware accelerators have aimed to increase storage performance, and have not involved processing data prior to storage to form compressed data to improve a later data processing.

Figure 2:
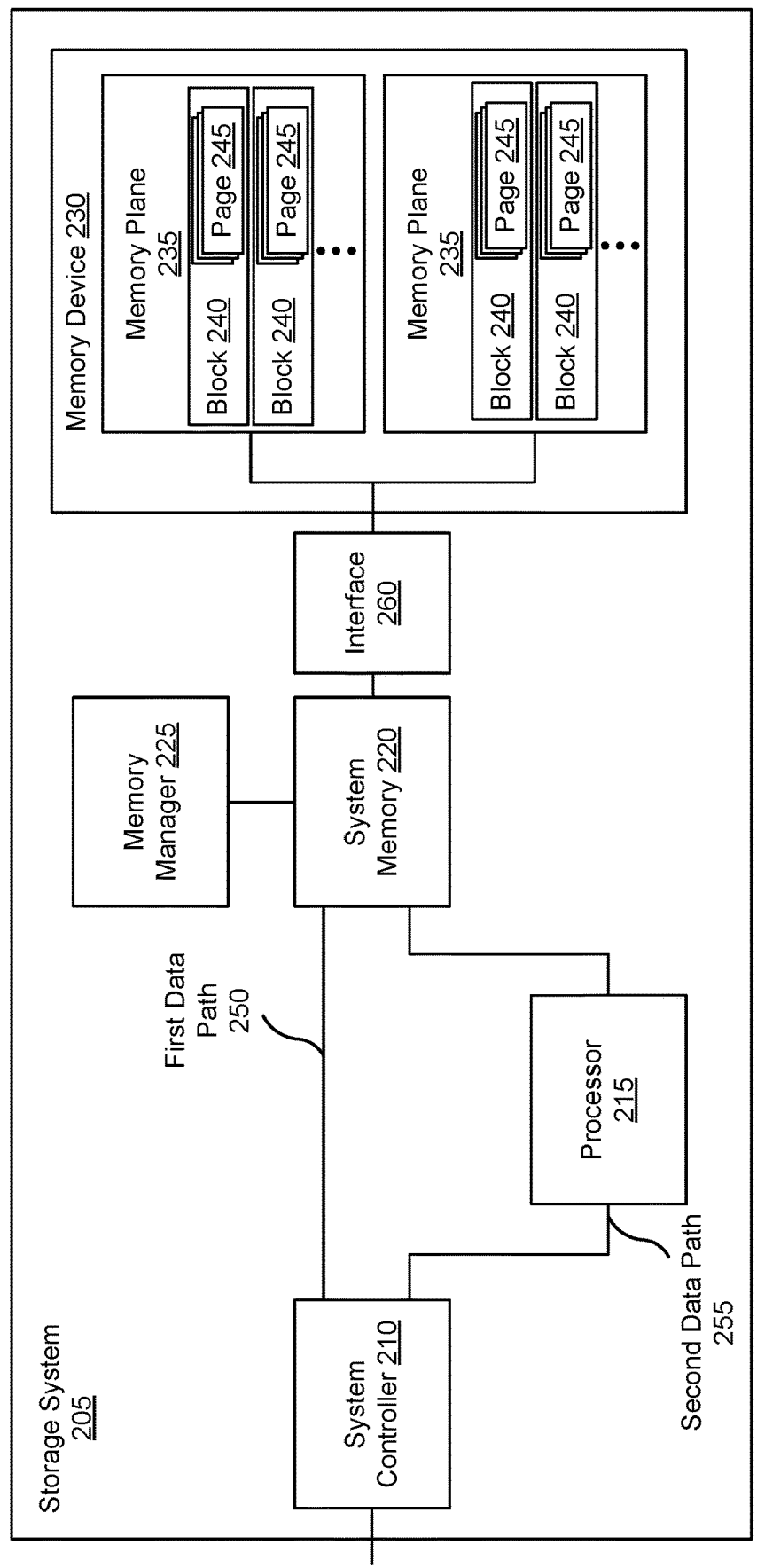
FIG. 2 is a diagram illustrating an example of a storage system capable of storing data using multiple storage paths depending on data classifications.

FIG. 1 is a diagram illustrating an example system 100 capable of storing data using multiple storage paths depending on data classifications. The system 100 may include one or more devices, apparatuses, and/or components for performing operations described herein (e.g., for storing data using multiple storage paths depending on data classifications). For example, the system 100 may include a host device 110 and a storage system 120. The storage system 120 may include a system controller 130 and a memory device 140. The host device 110 may communicate with the storage system 120 (e.g., the system controller 130 of the storage system 120) via a host interface 150. The system controller 130 and the memory device 140 may communicate via an input/output (I/O) interface. The system controller 130 and the memory device 140 may be associated with a first data path 160, where the first data path 160 may be associated with a first data classification. The system controller 130 and the memory device 140 may also be associated with a second data path 170, where the second data path 170 may be associated with a second data classification. The first data path 160 may exclude a processor (e.g., processor 215 as shown in FIG. 2), and the second data path 170 may include the processor. The processor may also be referred to as a pre-processor, as described in further detail below.

In some implementations, the first data path 160 may be a primary data path, and the second data path 170 may be a secondary data path. The primary data path may be associated with the first data classification, and the secondary data path may be associated with the second data classification. In other words, data associated with the first data classification may be associated with the primary data path, and data associated with the second data classification may be associated with the secondary data path.

The system 100 may be any electronic device configured to store data in memory. For example, the system 100 may be a computer, a mobile phone, a wired or wireless communication device, a network device, a server, and/or an Internet of Things (IoT) device. The host device 110 may include one or more processors configured to execute instructions and store data in the memory device 140. For example, the host device 110 may include a central processing unit (CPU), a graphics processing unit (GPU), a field-programmable gate array (FPGA), an application-specific integrated circuit (ASIC), and/or a controller.

The storage system 120 may be any electronic device configured to store data in memory. In some implementations, the storage system 120 may be an electronic device configured to store data persistently in non-volatile memory. For example, the storage system 120 may be a hard drive, a solid-state drive (SSD), a flash memory device (e.g., a NAND flash device), a universal serial bus (USB) thumb drive, a memory card (e.g., a secure digital (SD) card), a secondary storage device, and/or an embedded multimedia card (eMMC) device.

The system controller 130 may be any device configured to communicate with the host device (e.g., via the host interface 150) and the memory device 140 (e.g., via the I/O interface) and/or configured to control operations of the storage system 120. For example, the system controller 130 may include an ASIC, an FPGA, a processor, and/or a controller.

The memory device 140 may be a non-volatile memory device configured to maintain data stored in memory after the memory device 140 is powered off (e.g., configured for persistent data storage). In some implementations, the memory device 140 is a NAND memory device. Although some techniques are described herein in connection with NAND memory devices, in some implementations, one or more of these techniques may be performed in connection with other types of non-volatile memory devices, such as NOR memory devices.

The system controller 130 may transmit a command to the memory device 140 based on an instruction received from the host device 110. The command may be, for example, a read command, a write command (sometimes called a program command), or an erase command. Additionally, or alternatively, the command may indicate the data to be read, written, or erased, and/or may indicate a location (e.g., in memory) for the data to be read, written, or erased.

In some implementations, the system controller 130 may receive, via the host interface 150, a write command and data associated with the write command. The system controller 130 may classify the data. The system controller 130 may classify the data with the first data classification or the second data classification depending on a data type (e.g., non-image data or image data). The system controller 130 may classify the data based on a file extension associated with the data and/or a command descriptor indicated in the write command. The system controller 130 may direct the data to the first data path 160 based on classifying the data, or alternatively, the system controller 130 may direct the data to the second data path 170 based on classifying the data. The second data path 170 may be configured to cause data compression, and the first data path 160 may not be configured to cause data compression. In other words, the primary data path may not be associated with data compression, and the secondary data path may be associated with data compression. When "directing" the data, the system controller 130 may classify (e.g., tag) the data (e.g., with the first data classification or the second data classification), which may be considered as "directing" the data to the first data path 160 or the second data path 170 associated with that data classification.

In some implementations, data associated with the first data path 160 may not be processed by the processor, since the first data path 160 may exclude the processor. The data associated with the first data path 160 may be uncompressed data (e.g., original data). The system controller 130 may write the uncompressed data to the memory device 140 based on the write command. In some implementations, data associated with the second data path 170 may be processed by the processor, since the second data path 170 may include the processor. The data associated with the second data path 170 may become compressed data. The processor may write the compressed data to the memory device 140 based on the write command.

In some implementations, the processor may be referred to as a pre-processor, since the pre-processor may process data before the data is stored in the memory device 140, which may result in pre-processed data being stored in the memory device 140. The pre-processed data may be compressed data. The pre-processed data may be later retrieved by the host device (e.g., a primary processor), and the pre-processed data may be processed for various applications, such as machine learning or artificial intelligence. Data may initially be pre-processed by the pre-processor to form the pre-processed data (e.g., compressed data), and then the pre-processed data may be processed by the host device.

As indicated above, FIG. 1 is provided as an example. Other examples may differ from what is described with regard to FIG. 1.

FIG. 2 is a diagram illustrating an example 200 of a storage system 205 capable of storing data using multiple storage paths depending on data classifications. In some implementations, the storage system 205 is the storage system 120 described above in connection with FIG. 1. As shown, the storage system 205 may include a system controller 210, a processor 215, a system memory 220, a memory manager 225, an interface 260, and a memory device 230. The system controller 210 and the memory device 230 are the system controller 130 and the memory device 140, respectively, as described above in connection with FIG. 1. The system controller 210, the system memory 220, and the memory device 230 may be associated with a first data path 250, which is the first data path 160 described above in connection with FIG. 1. The system controller 210, the processor 215, the system memory 220, and the memory device 230 may be associated with a second data path 255, which is the second data path 170 described above in connection with FIG. 1. Further, the memory device 230 may include one or more memory planes 235, multiple blocks 240 (e.g., memory blocks), and/or multiple pages 245 (e.g., memory pages).

The system controller 210 may include one or more components configured to perform operations associated with storing data using multiple storage paths depending on data classifications. The system controller 210 may include, for example, one or more processors, a microcontroller, an ASIC (e.g., an SSD ASIC), and/or an FPGA. In some implementations, a non-transitory computer-readable medium (e.g., volatile memory and/or non-volatile memory) may store a set of instructions (e.g., one or more instructions or code) for execution by the system controller 210. The system controller 210 may execute the set of instructions to perform one or more operations or methods described herein. For example, the system controller 210 may execute firmware instructions stored in a memory plane 235 (e.g., in a read-only memory block of the memory plane 235), which may be loaded into the system memory 220 for execution by the system controller 210. Additionally, or alternatively, the system controller 210 may execute one or more instructions received from the host device 110. In some implementations, hardwired circuitry is used instead of or in combination with the instructions to perform one or more operations or methods described herein. Thus, implementations described herein are not limited to any specific combination of hardware circuitry and software.

The processor 215 may include one or more components configured to perform data compression depending on data classifications. The processor 215 may include, for example, one or more processors (e.g., one or more pre-processors), a microcontroller, an ASIC, and/or an FPGA. In some implementations, the non-transitory computer-readable medium (e.g., volatile memory and/or non-volatile memory) may store a set of instructions (e.g., one or more instructions or code) for execution by the processor 215. The processor 215 may execute the set of instructions to perform one or more operations or methods described herein. For example, the processor 215 may execute firmware instructions stored in a memory plane 235 (e.g., in the read-only memory block of the memory plane 235), which may be loaded into the system memory 220 for execution by the system controller 210. Additionally, or alternatively, the processor 215 may execute one or more instructions received from the system controller 210. In some implementations, hardwired circuitry is used instead of or in combination with the instructions to perform one or more operations or methods described herein. Thus, implementations described herein are not limited to any specific combination of hardware circuitry and software.

In some implementations, the system controller 210 may receive a write command and data associated with the write command. The system controller 210 may classify the data. The system controller 210 may classify the data with a first data classification or a second data classification depending on a data type (e.g., non-image data or image data). The system controller 210 may classify the data based on a file extension associated with the data and/or a command descriptor indicated in the write command. The data may be processed on the first data path 250 based on the first data classification, or alternatively, the data may be processed on the second data path 255 based on the second data classification. The second data path 255 may be configured to cause data compression using the processor 215, and the first data path 250 may not be configured to cause data compression since the first data path 250 may exclude the processor 215.

In some implementations, when the data is associated with the second data classification, the processor 215 may compress the data to form compressed data. The processor 215 or the system controller 210 may write the compressed data to the memory device 230 based on the write command. In some implementations, when the data is associated with the first data classification, the system controller 210 may write the data (e.g., uncompressed data) to the memory device 230.

The system memory 220 may include one or more components configured to store data, such as a logical-to-physical address translation table, cached data for write operations, cached data for read operations, error correction information such as parity bits, and/or metadata. The system memory 220 may store the data only when the system memory 220 is powered on and may lose the data when the system memory 220 is powered off. For example, the system memory 220 may be random-access memory (RAM), such as static random-access memory (SRAM) or DRAM.

The memory manager 225 may include one or more components (e.g., circuitry) configured to perform one or more memory management functions, such as wear leveling, error detection, error correction, block retirement, or one or more other memory management functions. The memory manager 225 may allocate resources of the system memory 230 for processing commands received from the system controller 210. The memory manager 225 may generate one or more memory commands based on the commands received from the system controller 210 and/or one or more other components of the storage system 205.

The memory manager 225 may include or may operate using one or more memory management tables, which may be configured to store information associated with the memory device 230. For example, a memory management table may include information regarding block age, block erase count, error history, or one or more error counts associated with one or more blocks 240 of the memory device 230.

The interface 260 may include one or more components configured to receive data from a device external to the memory device 230 (e.g., the system controller 210 or the processor 215) and transmit the data to a component internal to the memory device 230 (e.g., the memory plane 235, the block 240, and/or the page 245), or vice versa. For example, the interface 260 may include physical components (e.g., bond pads, contact pads, wires, metallic components, and/or electrically conductive components) that connect with and/or interface with the system controller 210, the processor 215, and/or the system memory 220. In some implementations, the interface 260 may be configured to convert from a first data rate and/or a first data format to a second data rate and/or a second data format. For example, the interface 260 may include one or more data buffers and/or one or more data registers for storing data to convert between different data rates or different data formats.

A memory plane 235 is a memory component that is disposed on a die and may include multiple memory blocks 240. Although the memory device 230 is shown as including two memory planes 235, the memory device 230 may include a different quantity of memory planes 235. A block 240 is a memory component of a plane 235, and a page 245 is a memory component of a block 240. A block 240 may include multiple pages 245.

The first data path 250 and the second data path 255 may include one or more components configured to transfer data between components internal to the storage system 205. For example, the first data path 250 may include one or more components configured to transfer data from the system controller 210 to the memory device 230, or vice versa. The second data path 255 may include one or more components configured to transfer data from the system controller 210 to the memory device 230, or vice versa. The processor 215 may be included on the second data path 255, but the processor 215 may be excluded from the first data path 250. The system memory 220 and the memory manager 225 may be associated with both the first data path 250 and the second data path 255.

The quantity and arrangement of components shown in FIG. 2 are provided as an example. In practice, the device 200 may include additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of the device 200 may perform one or more functions described as being performed by another set of components of the device 200.

Figure 3A:
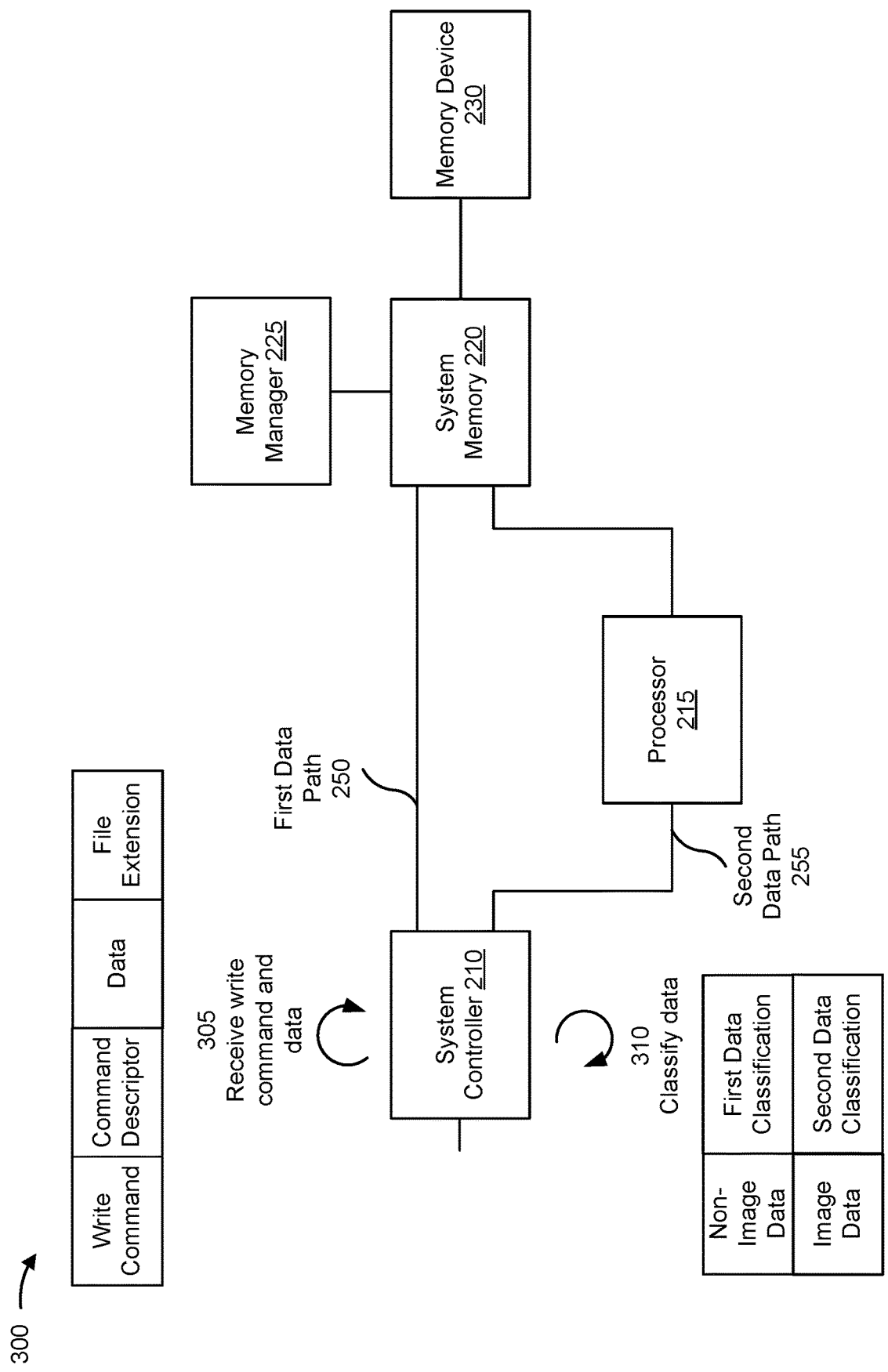
FIGS. 3A-3C are diagrams illustrating an example of a system capable of storing data using multiple storage paths depending on data classifications.
Figure 3B:
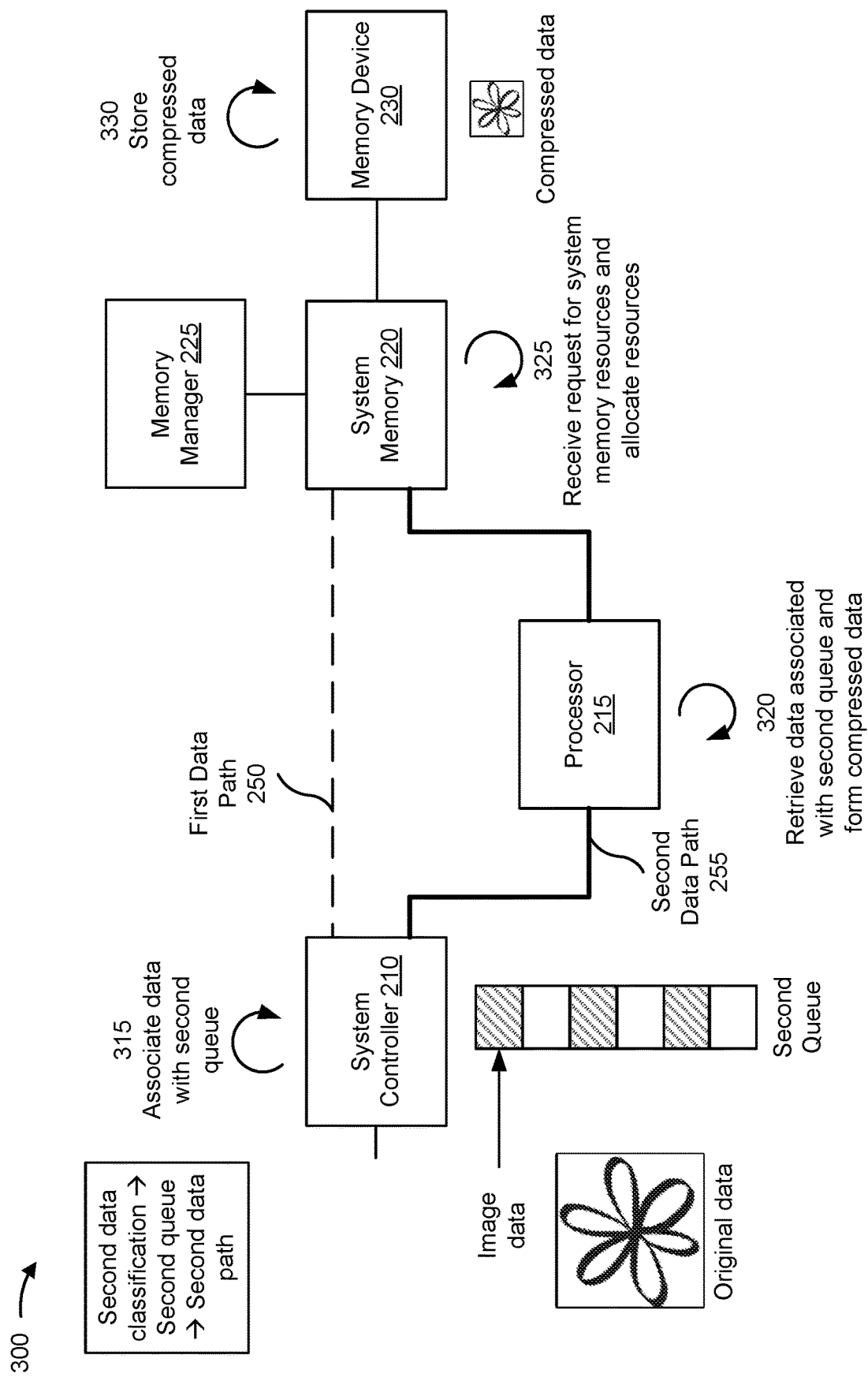
Figure 3C:
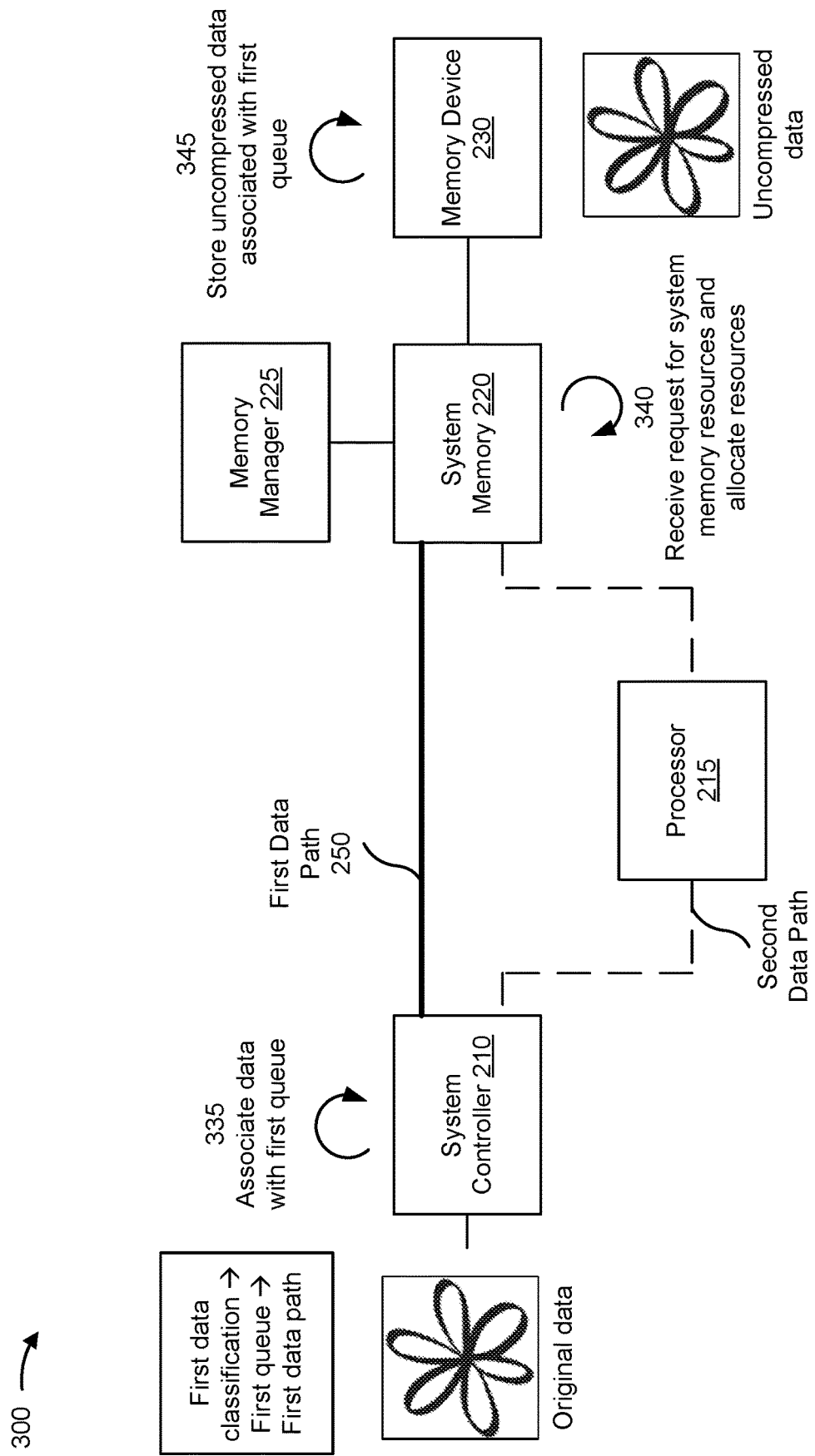

FIGS. 3A-3C are diagrams illustrating an example 300 of a storage system capable of storing data using multiple storage paths depending on data classifications. The storage system may be storage system 120, 205 as described above in connection with FIGS. 1 and 2. The storage system may be an SSD storage system. The storage system may include a system controller (e.g., system controller 210), a processor (e.g., processor 215), a system memory (e.g., system memory 220), a memory manager (e.g., memory manager 225), and a memory device (e.g., memory device 230). The memory device may be a NAND memory device.

In some implementations, the storage system may include a first data path (e.g., first data path 250), which may include the system controller, the system memory, and the memory device. The first data path may exclude the processor. The first data path may not be associated with data compression, due to the processor being excluded from the first data path. Data associated with the first data path may not become compressed. In some implementations, the storage system may include a second data path (e.g., second data path 255), which may include the system controller, the processor, the system memory, and the memory device. The second data path may be associated with data compression, due to the processor being included in the second data path. Data associated with the second data path may become compressed using the processor. The processor may be an accelerator (e.g., an SSD accelerator) onboard the storage system (e.g., an SSD storage system) that is capable of processing data (e.g., processing the data to achieve data compression) prior to the data being stored on the memory device. Further, the system memory and the memory manager may be shared between the first data path and the second data path.

As shown by FIG. 3A, and by reference number 305, the system controller may receive a write command and data associated with the write command. The system controller may receive the write command from a host device (e.g., host device 110) via a host interface (e.g., host interface 150). The write command may indicate that the data is to be written to the memory device. The write command may indicate a logical address in which the data is to be written to the memory device. The logical address may be different from a physical address associated with the memory device at which the data is written. The data may be any type of data, such as machine learning data. The write command may indicate one or more command descriptors, which may provide additional information regarding the write command. The data may be a data file, and the data may be associated with a file extension. The file extension may indicate the data type (e.g., image, audio, video, or text).

As shown by reference number 310, the system controller may classify the data. The system controller may classify the data depending on the data type. The system controller, when classifying the data, may assign a data classification (e.g., tag) to the data based on the data type. The data classification may be a binary classification. For example, the system controller may assign a first data classification (e.g., a first tag) to the data depending on the data type. Alternatively, the system controller may assign a second data classification (e.g., a second tag) to the data depending on the data type. The first data classification may be associated with a first data type, and the second data classification may be associated with a second data type. In some cases, the second data type may be any data type other than the first data type.

In some implementations, the system controller may classify the data based on a command descriptor indicated in the write command. The command descriptor may indicate the data type associated with the data to be written to the memory device. For example, the command descriptor may include one or more flags, which may indicate the data type associated with the data. In this example, the host device may indicate that the data is an image, audio, video, and/or text. In some implementations, the system controller may classify the data based on the file extension associated with the file. The system controller may determine the file extension by analyzing the data, and then look up the file extension in a table maintained by the system controller. The table may indicate different types of file extensions and corresponding data types. In this example, the host device may not indicate the data type, but rather the system controller may determine the data type itself. Depending on the command descriptor and/or the file extension, the system controller may classify the data as being either the first data classification or the second data classification.

As an example, the system controller may determine the first data classification as being a non-image data classification, or the second data classification as being an image data classification, based on the command descriptor and/or the file extension. The first data path may be associated with processing non-image data, and the second data path may be associated with processing image data. In this example, data classifications may distinguish between non-image data and image data, with an assumption that image data is more likely to be associated with noise and/or data redundancy as compared to non-image data, and thus the image data may need to be compressed whereas the non-image data may not need data compression.

In another example, data classifications may distinguish between non-audio data and audio data, with an assumption that audio data is more likely to be associated with noise and/or data redundancy as compared to non-audio data, and thus the audio data may need to be compressed whereas the non-audio data may not need data compression. In yet another example, data classifications may distinguish between non-video data and video data, with an assumption that video data is more likely to be associated with noise and/or data redundancy as compared to non-video data, and thus the video data may need to be compressed whereas the non-video data may not need data compression.

In some implementations, the system controller may manage a first queue and a second queue. The first queue may be associated with the first data path, and the second queue may be associated with the second data path. The first queue may be associated with the first data classification. The second queue may be associated with the second data classification. The first queue and the second queue may be first-in first-out (FIFO) queues or circular queues. Data may be associated with the first queue or the second queue depending on whether the data is associated with the first data classification or the second data classification. Data that is associated with the first queue or the second queue may be processed in an appropriate order (e.g., FIFO), depending on the type of queue.

In some implementations, the system controller may manage a shared queue, which may be associated with both the first data path and the second data path. Data that is associated with the shared queue may be tagged with the first data classification or the second data classification, which may indicate whether the data is associated with the first data path or the second data path. Data that is associated with the shared queue may be processed in an appropriate order (e.g., FIFO), depending on the type of shared queue.

As shown by FIG. 3B, and by reference number 315, when the system controller classifies the data with the second data classification, the system controller may associate the data (e.g., image data) with the second queue. The second queue may be associated with the second data path, which may be associated with the data compression. The system controller may direct the data to the second data path that includes the processor based on the data being associated with the second data classification.

As shown by reference number 320, the processor included on the second data path may retrieve the data associated with the second queue, and the processor may compress the data to form compressed data. The processor may receive original, uncompressed data, and then may apply data compression to obtain the compressed data. The processor may use any suitable data compression technique, such as image compression, audio compression, or video compression. The data compression technique may depend on the data type (e.g., image, audio, or video). Additionally, or alternatively, the processor may use any suitable noise reduction technique, such as deblurring, sound masking, and/or video de-noising. Additionally, or alternatively, the processor may also use various machine learning techniques to identify noise and/or data redundancy in the data, and then remove such noise and/or redundant data accordingly. The compressed data may be associated with less noise and/or less data redundancy, as compared to the data prior to the data compression.

In some implementations, when compressing image data (e.g., original image data), the processor may segment the image data into a plurality of segments. The processor may segment the image data based on colors, boundaries, shapes, and/or hues. The processor may identify one or more segments, of the plurality of segments, with redundant information based on an analysis of the plurality of segments. For example, the processor may collect pixels associated with similar colors or hues, and/or pixels associated with a same shape or boundary, and the processor may remove redundant information. The processor may remove the one or more segments. The processor may normalize the data, which may involve changing a scale (e.g., changing the data to be associated with a log scale). As a result, the processor may form the compressed data, which may be associated with less noise and/or data redundancy as compared to the original image data.

As an example, an original image of a flower may be associated with the second queue. The processor included on the second data path may retrieve the original image of the flower associated with the second queue, and the processor may compress the original image of the flower to conform a compressed image of the flower. The processor may segment the original image of the flower into multiple segments based on different colors, boundaries, shapes, and/or hues. A number of segments may depend on a capability of the processor. For example, a higher capability processor may be able to form a larger number of segments, as compared to a lower capability processor. The processor may form groups of pixels with the same colors or hues, and/or the processor may identify groups of pixels associated with the same boundaries or shapes. The processor may determine that certain groups of pixels are redundant pieces of data, and the processor may remove these groups of pixels when forming the compressed image of the flower. However, the processor may store metadata (e.g., indications of certain groups of pixels that have been removed and/or certain groups of pixels that are considered to be redundant data) that enables the compressed image of the flower to be uncompressed to form the original image of the flower.

As shown by reference number 325, the memory manager may receive, from the processor, a request for system memory resources of the system memory, and the memory manager may allocate the system memory resources of the system memory based on the request. The processor may directly communicate with the system memory and/or the memory manager. The request may be for processing the write command associated with storage of the compressed data. The request may be for an amount of system memory resources that is appropriate for a size of the compressed data. The compressed data may be stored in the system memory based on the allocation of the system memory resources, prior to being stored in the memory device. The compressed data may be translated for storage in the memory device using a logical-to-physical address translation table, stored in the system memory, which may be used to determine an appropriate memory location for storing the compressed data in the memory device. Further, the memory manager may perform other actions on the compressed data prior to storage of the compressed data in the memory device, such as performing data encoding (e.g., low-density parity-check (LDPC) encoding), performing encryption, performing error correction, adding parity bits, and/or adding metadata.

In some implementations, after the system controller tags data with the second data classification, the system controller may send an indication to the memory manager. The indication may indicate to the memory controller that the processor is expected to request system memory resources from the system memory. In other words, the indication may provide an early notification to the memory manager, such that the memory manager may expect the request for system memory resources from the processor. As a result, the memory manager may be able to better manage requests received from the processor (e.g., for allocations of system memory resources for storing compressed data) versus requests received from the system controller (e.g., for allocations of system memory resources for storing uncompressed data).

In some implementations, the memory manager may be configured to allocate system memory resources for both the second data path and the first data path. The memory manager and the system memory may be shared by both the system controller and the processor involved in the data compression. The memory manager may balance a resource allocation between the second data path and the first data path, such that system memory resources assigned to the second data path may be relatively equal to system memory resources assigned to the first data path. In some cases, a difference between system memory resources assigned to the second data path and system memory resources assigned to the first data path may be within a threshold. Depending on the data type and/or a data size, system memory resources may be allocated for the first data path with a higher priority as compared to system memory resources that are allocated for the second data path, or vice versa.

As shown by reference number 330, the compressed data may be stored in the memory device based on the write command. The system controller and/or the processor may write the compressed data onto the memory device based on the write command. The compressed data may be stored in one or more pages, blocks, and/or memory planes of the memory device based on the write command. The compressed data may be stored in the memory device based on the appropriate memory location, as determined using the memory manager. The compressed data may be associated with reduced noise and/or reduced data redundancy, as compared to original data that is instructed to be written to the memory device from the host device.

As shown by FIG. 3C, and by reference number 335, when the system controller classifies the data with the first data classification, the system controller may associate the data (e.g., non-image data) with the first queue. The first queue may be associated with the first data path, which may be associated with no data compression. The system controller may direct the data to the first data path that excludes the processor based on the data being associated with the first data classification. The data associated with the first data path may be considered to be uncompressed data.

As shown by reference number 340, the memory manager may receive, from the system controller, a request for system memory resources of the system memory, and the memory manager may allocate the system memory resources of the system memory based on the request. The system controller may directly communicate with the system memory and/or the memory manager. The request may be for processing the write command associated with storage of the uncompressed data in the memory device. The uncompressed data may be stored in the system memory based on the allocation of the system memory resources. The uncompressed data may be translated for storage in the memory device using the logical-to-physical address translation table, stored in the system memory, which may be used to determine an appropriate memory location for storing the uncompressed data in the memory device. Further, the memory manager may perform other actions on the uncompressed data prior to storage of the uncompressed data in the memory device, such as performing data encoding (e.g., LDPC encoding), performing error correction, adding parity bits, and/or adding metadata.

As shown by reference number 345, the uncompressed data may be stored in the memory device based on the write command. The system controller may write the uncompressed data into the memory device based on the write command. The uncompressed data may be stored in one or more pages, blocks, and/or memory planes of the memory device based on the write command. The uncompressed data may be stored in the memory device based on the appropriate memory location, as determined using the memory manager. The uncompressed data, since being associated with the first data classification, may still be associated with relatively little noise and/or data redundancy.

In some implementations, the system controller may receive write commands from the host device. For each write command, the system controller may determine whether to tag corresponding data with the first data classification or the second data classification. Data tagged with the first data classification may be associated with the first queue, and data tagged with the second data classification may be associated with the second queue. Data associated with the second queue may be processed by the processor, whereas data associated with the first queue may be written to the memory device. The system controller may interleave a processing of the first queue and the second queue. For example, the system controller may process data associated with the first queue, then process data associated with the second queue, then process additional data associated with the first queue, and so on. In other words, the system controller may switch between the first queue and the second queue, such that a priority between the first queue and the second queue may be relatively equal. In some cases, the priority between the first queue and the second queue may not be relatively equal, in which case the system controller may process data associated with the first queue before processing data associated with the second queue, or vice versa. A maximum delay for writing data to the memory device may be defined (e.g., 500 ms), irrespective of a priority associated with the data. As another example, the system controller may process all existing data associated with the first queue, and then may process outstanding data associated with the second queue. As yet another example, the system controller may process all existing data associated with the second queue, and then may process outstanding data associated with the first queue.

In some implementations, the first data path may be considered a traditional data path, in which data associated with commands (e.g., write commands or read commands) may be written to the memory device or read from the memory device. The second data path may provide an alternative data path to the first data path. The second data path may be used for specific data depending on the data type. For example, data types that may have an increased likelihood of having higher noise and/or higher data redundancy may be processed using the second data path, whereas data types that may be less likely to suffer from noise and/or data redundancy may be processed using the first data path. As a result, the storage system may function as a hybrid system, in which data may be processed in a traditional manner, or data may be processed using the processor to achieve data compression prior to the data being stored in the memory device.

In some implementations, the system controller may receive, from the host device, a read command to read data from the memory device. The data may be the compressed data. The read command may indicate a logical address associated with the data that is stored in the memory device. The memory manager may obtain an allocation of system memory resources from the system memory to store the data that has been retrieved from the memory device. The memory manager may determine the physical address, from the logical address, using the logical-to-physical address translation table stored in the system memory, which may enable the data to be read from the memory device. The host device may use the data for various applications, such as machine learning applications or artificial intelligence applications. Since the data may be associated with reduced noise and/or data redundancy, the data may not need to be further processed and may be directly used by one of the applications. In other words, since the data may be intelligently stored in the memory device (e.g., by first applying data compression), subsequent processing by the host device to remove noise and/or data redundancy may be eliminated. The compressed data may also consume less storage space on the memory device, as compared to uncompressed data. An overall system performance may be improved since data that is compressed, which may be data with a smaller size, may be stored and read from the memory device, as opposed to data that is not compressed, which may be data with a larger size. Storing data having the larger size in the memory device and reading data having the larger size from the memory device may involve additional processing complexity and/or power consumption.

As indicated above, FIGS. 3A-3C are provided as an example. Other examples may differ from what is described with regard to FIGS. 3A-3C.

FIG. 4 is a flowchart of an example method 400 associated with storing data using multiple storage paths depending on data classifications. In some implementations, a storage system (e.g., storage system 120, 205) may perform or may be configured to perform one or more process blocks of FIG. 4. In some implementations, another device or a group of devices separate from or including the storage system (e.g., host device 110) may perform or may be configured to perform one or more process blocks of FIG. 4. Additionally, or alternatively, one or more components of the storage system (e.g., system controller 130, 210, processor 215, system memory 220, memory manager 225, and/or memory device 140, 230) may perform or may be configured to perform one or more process blocks of FIG. 4.

As shown in FIG. 4, the method 400 may include receiving, via a host interface, a write command and data associated with the write command (block 410). As further shown in FIG. 4, the method 400 may include classifying the data (block 420). As further shown in FIG. 4, the method 400 may include directing the data to a first data path or a second data path based on classifying the data (block 430). The first data path may be between a system controller and a memory device, and the first data path may exclude a processor. The second data path may be between the system controller and the memory device, and the second data path may include the processor. The second data path may be configured to cause data compression and the first data path may not be configured to cause data compression.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein, such as the operations described in connection with FIGS. 1-3C.

Figure 5:
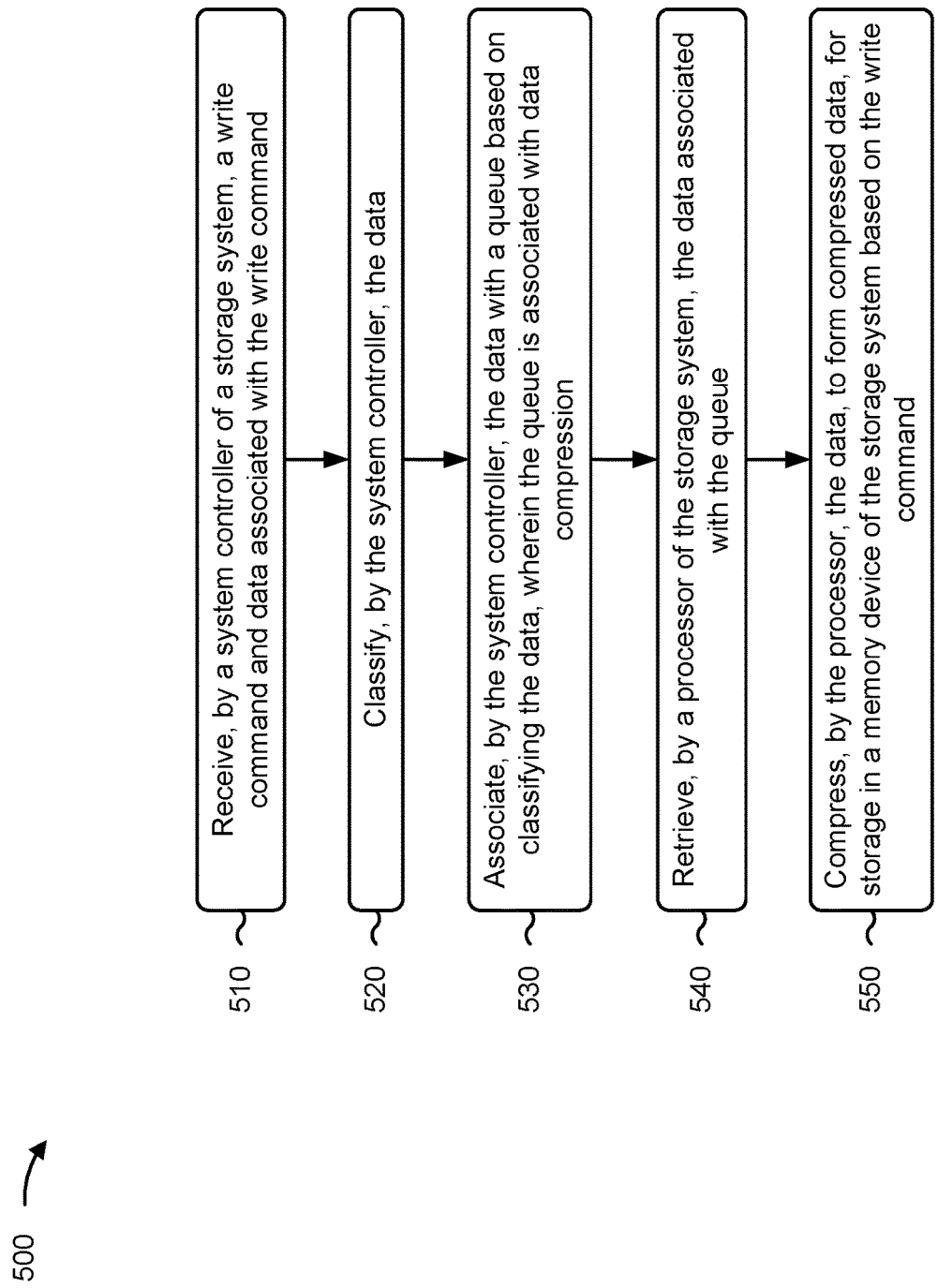

FIG. 5 is a flowchart of an example method 500 associated with storing data using multiple storage paths depending on data classifications. In some implementations, a storage system (e.g., storage system 120, 205) may perform or may be configured to perform one or more process blocks of FIG. 5. In some implementations, another device or a group of devices separate from or including the storage system (e.g., host device 110) may perform or may be configured to perform one or more process blocks of FIG. 5. Additionally, or alternatively, one or more components of the storage system (e.g., system controller 130, 210, processor 215, system memory 220, memory manager 225, and/or memory device 140, 230) may perform or may be configured to perform one or more process blocks of FIG. 5.

As shown in FIG. 5, the method 500 may include receiving, by the system controller of the storage system, a write command and data associated with the write command (block 510). As further shown in FIG. 5, the method 500 may include classifying, by the system controller, the data (block 520). As further shown in FIG. 5, the method 500 may include associating, by the system controller, the data with a queue based on classifying the data, wherein the queue is associated with data compression (block 530). As further shown in FIG. 5, the method 500 may include retrieving, by the processor of the storage system, the data associated with the queue (block 540). As further shown in FIG. 5, the method 500 may include compressing, by the processor, the data to form compressed data for storage in a memory device of the storage system based on the write command (block 550).

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein, such as the operations described in connection with FIGS. 1-3C.

Traditional medicine may be highly effective in some individuals but not as helpful in other individuals, which may be due to not all individuals having the same genetic characteristics. Traditional medicine is not typically customized per individual, and thus, some individuals may not benefit as greatly as other individuals.

In some implementations, an approach for guided medicine using genotype data may be defined, which may resolve some of the drawbacks associated with traditional medicine. Guided medicine may involve providing treatment or therapy based on genetic backgrounds of patients, where each patient may have a unique genetic background, which may dictate a unique treatment or therapy for that patient. The unique treatment or therapy recommended for a particular patient may be based on an output of a machine learning model, which may take various information about the particular patient (e.g., genotype information) as input in order to produce the output.

With guided medicine, routine clinical application of genotype data to drug prescriptions or vaccine production may be incorporated into a healthcare infrastructure, which may improve patient outcomes. With guided medicine, features from nucleotide sequences may be extracted and/or future nucleotide features or sequence patterns may be predicted, which may provide helpful hints to medicine manufacturers and encourage customized treatment. Guided medicine may be applicable to specific ailments or may be applied in a more widespread manner. The healthcare infrastructure may support genomic pattern recognition as part of a yearly health checkup, where collected data may be used as training data for the machine learning model that outputs information related to guided medicine on a per-patient level. The data (e.g., genomic data and other related data) may be efficiently stored and, in some cases, preprocessed before storage. The data may be prepared for a machine learning algorithm before storage of the data.

In some implementations, guided medicine using genotype data may be applicable for smart vaccines. A storage system with a hardware accelerator, such as the storage system described with respect to FIGS. 3A-3C, may be used for data processing to reduce noise for smart vaccines. In some cases, the machine learning model may be based on a convolutional neural network (CNN), a recurrent neural network (RNN), and/or a long short-term memory (LSTM) neural network, and different weights may be used for the machine learning model. Such weights may be associated with a mortality rate, a host infection rate, a degree of transmission, family, climate, and/or diseases. An ability to use genotype data in machine learning models may provide or enable smart medicine, customized medicine, an increased efficacy of medicine, preemptive treatment, and/or decreased side effects.

In some implementations, a system may include a first CNN model, a second CNN model, and an LSTM model, which may be linked together with a database that stores terabytes of human-virus genotype interaction data. The first CNN model may be a human genotype CNN model. The first CNN model may be a standard feature extraction model that classifies patients into health classes based on a variety of input data, such as the patient's demographic, current health conditions, and so on. The second CNN model may be a virus/pathogen CNN model. The second CNN model may classify a disease-causing organism into various degrees of threat based on a variety of input factors. Data may be well-defined and validated based on the involvement and cooperation of provider networks that keep track of a patient's transient genetic information, as well as infectious disease labs that have databases of pathogenetic data. The data may be fed into the LSTM model, which may be capable of learning long term dependencies. An output of the system may be a time-series analyzed genetic sequence which, while acting as a guide, may boost the efficacy of the medicine/vaccine several times more. This genotypic guide may be inserted in medicine vectors to make such medicine vectors genome guided instead of generic.

In some implementations, inputs to the first CNN model (the human genotype CNN model) may include a nucleotide sequence (before a virus), a nucleotide sequence (after a virus), diagnostic images (e.g., magnetic resonance imaging (MRI), x-rays, scans, and/or mammography), computer vision tasks, a blood composition, a nucleotide sequence (e.g., after a first vaccine and after a second vaccine), an age/race of a host, air quality, food habits, metabolism metrics, a basal metabolic rate (BMR), a heart rate, genetic ailments, medications, phenotype to genotype data, and/or a dual infection occurrence. The inputs to the second CNN model (the virus/pathogen CNN model) may include family information, a degree of transmission, adaptability information, pre-editing information (e.g., an indication of artificial mutations done), a frequency of mutations, radiation exposure, and/or source information (e.g., human or animal). The LSTM model may use pattern recognition and deoxyribonucleic acid (DNA) analysis to predict future possible host DNA mutations and potential virus variants. Further, a time series analysis algorithm (or sequence analysis) may be modified to predict a DNA sequence post virus attack by taking inputs from the first CNN model, the second CNN model, and a provider database.

In some implementations, a provider network database of genomic information may be created. A weighted human genome sequencing may be executed. A virus genome sequencing may be executed. A pattern recognition and pattern prediction may be performed using a time series algorithm based on the weighted human genome sequencing and the virus genome sequencing. An LSTM output may be used to create customized medicine or a smart vaccine.

Figure 6:
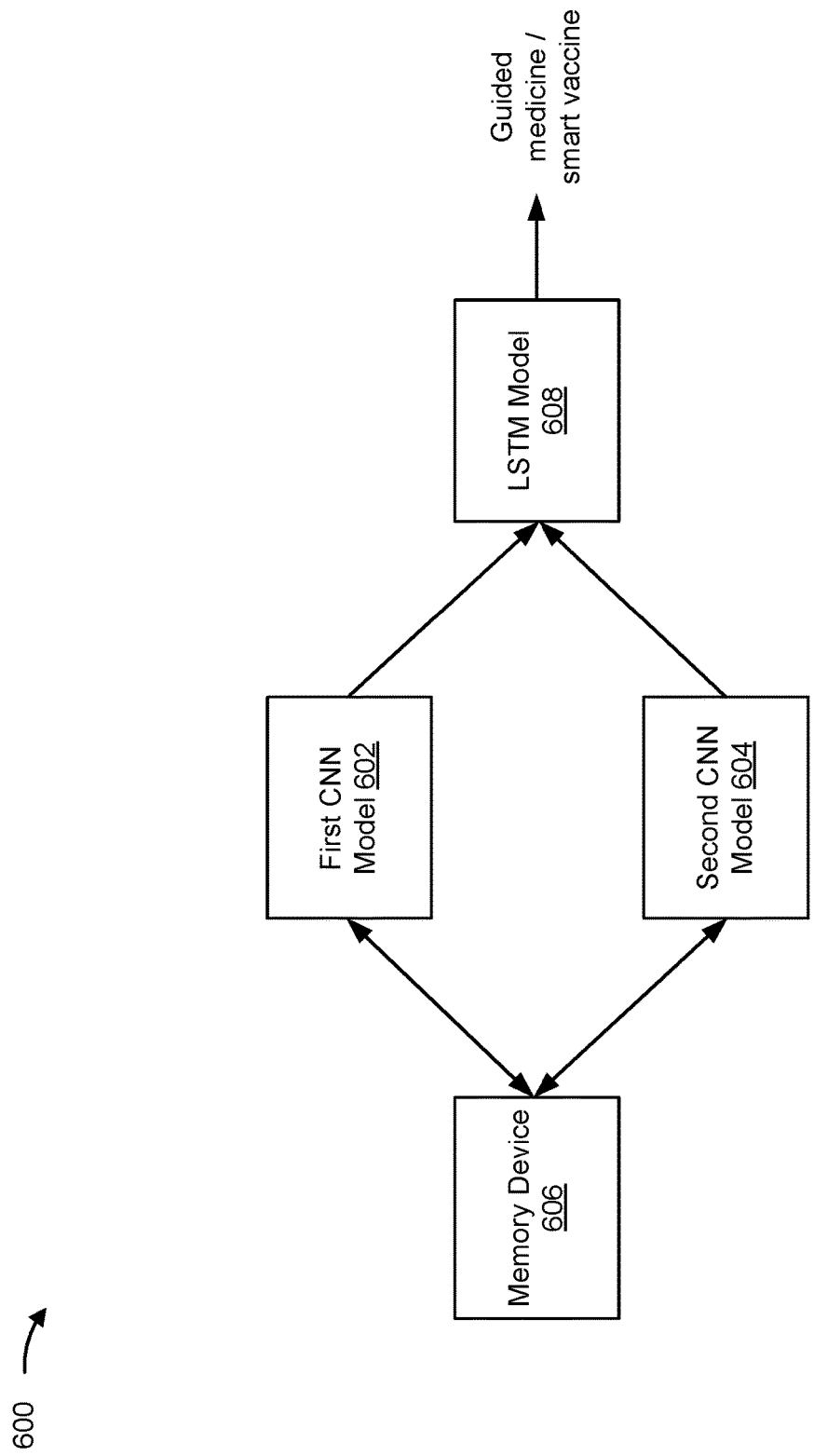
FIG. 6 is a diagram illustrating an example of a smart vaccine model.

FIG. 6 is a diagram illustrating an example 600 of a smart vaccine model. The smart vaccine model may be a CNN-LSTM smart vaccine model.

As shown in FIG. 6, a first CNN model 602 (e.g., a human genotype CNN model) may be associated with a weighted human genome sequencing. The first CNN model 602 may be a weighted model (e.g., a first weight may be associated with heart patients and a second weight may be associated with diabetic patients). The first CNN model 602 may run on a provider analytics cloud. A second CNN model 604 (e.g., a virus/pathogen CNN model) may be associated with a virus genome sequencing. The second CNN model 604 may run on a biogenetics labs cloud. The first CNN model 602 and the second CNN model 604 may communicate with a storage system 606 (e.g., an SSD), which may maintain a database of human and virus genome interaction information. The storage system 606 may be a storage system capable of storing data using multiple storage paths depending on data classifications, as described in FIGS. 3A-3C. The database may be associated with provider networks. The storage system 606 may include with an image data accelerator. The first CNN model 602 and the second CNN model 604 may be connected to an LSTM model 608, which may output an LSTM sequence prediction based on the first CNN model 602 and the second CNN model 604. The LSTM model 608 may run on an analytics cloud. The LSTM sequence prediction may be used for guided medicine and/or smart vaccines. For example, regarding smart vaccines, the LSTM sequence prediction may provide a dosage for effectiveness, information regarding boosters, and/or information that accounts for mutations of a common cold (which may mutate too frequently for traditional vaccines).

In some implementations, the first CNN model 602 (e.g., a host genome sequencing CNN model) may be based on a large set of input data, which may include information regarding air quality, food types, age, metabolism, race, genetic disabilities, and/or medications. The large set of input data may be associated with physical health factors and/or environmental factors. A rectified linear unit (ReLu) activation may be applied to the large set of input data for training speedup. An average pooling may be applied for reducing a data dimension. A flattened layer of output data may be formed. The output data may form an input layer of a neural network. The neural network may include one or more hidden layers, which may depend on the input layer. The neural network may include an output layer. The output layer may be associated with one or more output classifiers (e.g., class 1 associated with a 99-100% mortality rate, class 2 associated with a 95-99% mortality rate, class 3 associated with a 75-95% mortality rate, or class N associated with a 0.01-0.1% mortality rate).

In some implementations, the second CNN model 604 (e.g., a virus genome sequencing CNN model) may be based on a large set of input data, which may include natural habitat mutations, environmental based mutation variation, genetic disability impacts, exposure to ultraviolet light or x-rays, and/or exposure to certain medications. An ReLu activation may be applied to the large set of input data for training speedup. An average pooling may be applied for reducing a data dimension. A flattened layer of output data may be formed. The output data may form an input layer of a neural network. The neural network may include one or more hidden layers, which may depend on the input layer. The neural network may include an output layer. The output layer may be associated with one or more output classifiers (e.g., class 1 associated with a 99-100% infection fatality ratio, class 2 associated with a 95-99% infection fatality ratio, class 3 associated with a 75-95% infection fatality ratio, or class N associated with a 0.01-0.1% infection fatality ratio).

As an example, an infection fatality ratio, a mortality rate of genome, and an existing database of human genotypes and virus genotypes may be provided as an input to the LSTM RNN network. An output from the LSTM RNN network may indicate a future time series gene expression for vectored medicine. The future time series gene expression for vectored medicine may be related to clinical pharmacogenetics, guided drug therapy, or antimicrobial susceptibility.

As indicated above, FIG. 6 is provided as an example. Other examples may differ from what is described with regard to FIG. 6.

Figure 7:
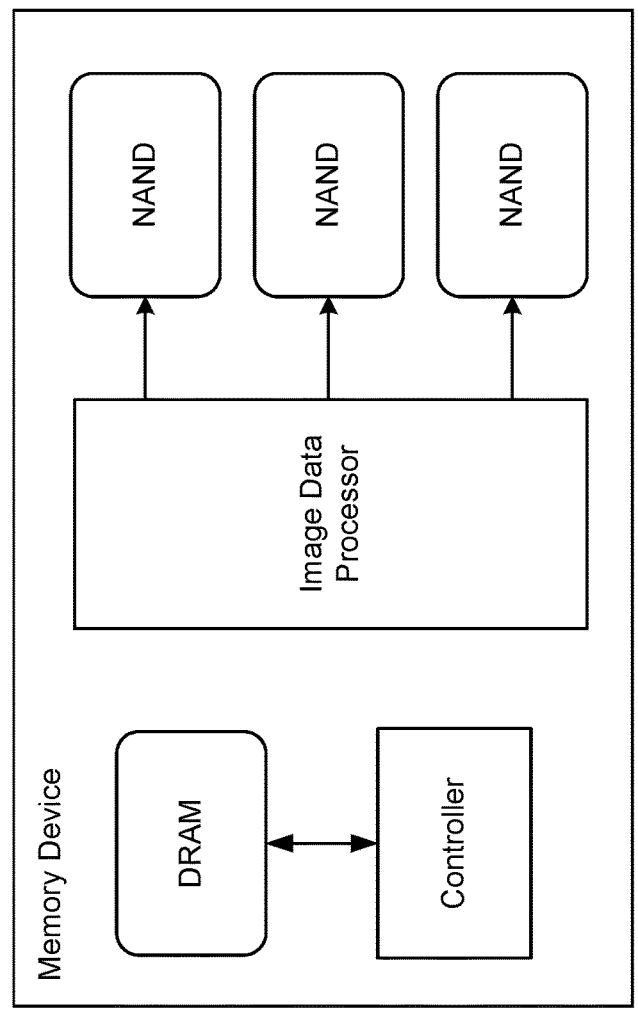
FIG. 7 is a diagram illustrating an example of a storage system configured to preprocess image data.

FIG. 7 is a diagram illustrating an example 700 of a storage system configured to preprocess image data.

As shown in FIG. 7, the storage system may include random-access memory, such as DRAM. The storage system may include a controller. The storage system may include an image data processor. The storage system may include non-volatile memory, such as NAND. The storage system may include firmware to preprocess images. For example, the storage system, when performing a preprocessing operation, may eliminate or reduce redundancy or repeat patterns, remove noise, resize images, perform normalizing operations, add missing image data, add bias, remove bias, and/or sort images. The preprocessing of image data may involve removing repeating nucleotide sequences from a plurality of nucleotide sequences (e.g., millions of nucleotide sequences). The preprocessing of image data may involve classifying single stranded versus double stranded sequences for different applications.

As indicated above, FIG. 7 is provided as an example. Other examples may differ from what is described with regard to FIG. 7.

In some implementations, a storage system includes a memory device; a first data path associated with a first queue; a second data path associated with a second queue; a system controller configured to: receive, via a host interface, a write command and data associated with the write command; classify the data; and associate the data with the second queue based on classifying the data, wherein the first queue is associated with a first data classification, and the second queue is associated with a second data classification; and a processor, included in the second data path, configured to: retrieve the data associated with the second queue; and compress the data, to form compressed data, for storage in the memory device based on the write command.

In some implementations, a system includes a host interface; a system controller; a memory device; a processor configured to perform data compression prior to storage in the memory device; a first data path, between the system controller and the memory device, that excludes the processor; and a second data path, between the system controller and the memory device, that includes the processor, wherein the system controller is configured to: receive, via the host interface, a write command and data associated with the write command; classify the data; and direct the data to the first data path or the second data path based on classifying the data, wherein the second data path is configured to cause data compression and the first data path is not configured to cause data compression.

In some implementations, a method includes receiving, by a system controller of a storage system, a write command and data associated with the write command; classifying, by the system controller, the data; associating, by the system controller, the data with a queue based on classifying the data; retrieving, by a processor of the storage system, the data associated with the queue; and compressing, by the processor, the data, to form compressed data, for storage in a memory device of the storage system based on the write command.

The foregoing disclosure provides illustration and description but is not intended to be exhaustive or to limit the implementations to the precise forms disclosed. Modifications and variations may be made in light of the above disclosure or may be acquired from practice of the implementations described herein.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A storage system, comprising:
   a memory device;
   a system controller;
   a first data path, between the system controller and the memory device, associated with a first queue;
   a second data path, between the system controller and the memory device, associated with a second queue,
   wherein the system controller is configured to:
      receive, via a host interface, a write command and data associated with the write command;
      classify the data; and
      associate the data with the second queue based on classifying the data, wherein the first queue is associated with a first data classification, and the second queue is associated with a second data classification; and
   a processor, included in only the second data path, configured to:
      retrieve the data associated with the second queue; and
      compress the data, to form compressed data, for storage in the memory device based on the write command, wherein only the second data path is configured to cause data compression.

2. The storage system of claim 1, wherein the system controller is configured to classify the data based on a file extension associated with the data.

3. The storage system of claim 1, wherein the system controller is configured to classify the data based on a command descriptor indicated in the write command.

4. The storage system of claim 1, wherein the first data classification is a non-image data classification, the first queue is a non-image queue, and the first data path is associated with processing of non-image data.

5. The storage system of claim 1, wherein the second data classification is an image data classification, the second queue is an image queue, and the second data path is associated with processing of image data.

6. The storage system of claim 1, wherein the processor, to compress the data, is configured to:
   segment the data into a plurality of segments;
   identify one or more segments, of the plurality of segments, with redundant information based on an analysis of the plurality of segments; and
   remove the one or more segments to form the compressed data.

7. The storage system of claim 1, wherein the processor is configured to:
   send, to a memory manager of the storage system, a request for system memory resources of a system memory, of the storage system, that stores one or more of: a logical-to-physical address translation table, cached data for write operations, cached data for read operations, error correction information including parity bits, or metadata, wherein the request is for processing the write command associated with storage of the compressed data; and
   receive, from the memory manager, an allocation of memory resources of the system memory of the storage system.

8. The storage system of claim 1, wherein the processor is configured to interleave processing of the first queue and processing of the second queue.

9. The storage system of claim 1, wherein:
the first data path includes the system controller, system memory, and the memory device; and
the second data path includes the system controller, the processor, the system memory, and the memory device.

10. The storage system of claim 1, wherein the storage system is a solid-state drive (SSD) storage system, and the memory device of the storage system is a NAND memory device.

11. A system, comprising:
a host interface;
a system controller;
a memory device;
a processor configured to perform data compression prior to storage in the memory device;
a first data path, between the system controller and the memory device, that excludes the processor; and
a second data path, between the system controller and the memory device, that includes the processor,
wherein the system controller is configured to:
receive, via the host interface, a write command and data associated with the write command;
classify the data; and
direct the data to the first data path or the second data path based on classifying the data, wherein the second data path is configured to cause data compression and the first data path is not configured to cause data compression.

12. The system of claim 11, wherein the system controller is configured to:
determine, based on classifying the data, that the data is associated with a first data classification; and
direct the data to the first data path that excludes the processor based on the data being associated with the first data classification.

13. The system of claim 11, wherein the system controller is configured to:
determine, based on classifying the data, that the data is associated with a second data classification; and
direct the data to the second data path that includes the processor based on the data being associated with the second data classification.

14. The system of claim 11, wherein the system controller is configured to:
send the data to a first queue based on classifying the data, wherein the first queue is associated with the first data path; and
send the data to a second queue based on classifying the data, wherein the second queue is associated with the second data path.

15. The system of claim 11, wherein the system controller is configured to:
determine that the data is image data based on a descriptor indicated in the write command; and
direct the data to the second data path based on the data being image data.

16. The system of claim 11, wherein:
the system controller is configured to direct the data to the second data path based on classifying the data; and
the processor is configured to compress the data based on the data being directed to the second data path, to obtain compressed data, for storage in the memory device based on the write command.

17. The system of claim 11, wherein the system controller or the processor is configured to:
send, to a memory manager, a request for system memory resources of a system memory that stores a logical-to-physical address translation table, wherein the request is for processing the write command; and
receive, from the memory manager, an allocation of memory resources of the system memory.

18. A method, comprising:
receiving, by a system controller of a storage system, a write command and data associated with the write command;
classifying, by the system controller, the data;
associating, by the system controller, the data with a queue, selected from a first queue and a second queue, based on classifying the data,
wherein the first queue is associated with a first data path between the system controller and a memory device of the storage system, and
wherein the second queue is associated with a second data path between the system controller and the memory device;
retrieving, by a processor of the storage system, the data associated with the queue, wherein the processor is included in only the second data path; and
compressing, by the processor, the data, to form compressed data, for storage in the memory device of the storage system based on the write command, wherein only the second data path is configured to cause data compression.

19. The method of claim 18, wherein compressing the data comprises:
segmenting the data into a plurality of segments;
identifying one or more segments, of the plurality of segments, with redundant information based on an analysis of the plurality of segments; and
removing the one or more segments to obtain the compressed data.

20. The method of claim 18, further comprising:
sending, by the processor to a memory manager of the storage system, a request for system memory resources of a system memory that stores a logical-to-physical address translation table, wherein the request is for processing the write command; and
receiving, by the processor from the memory manager, an allocation of memory resources of the system memory.

* * * * *